United States Patent [19]
Peot et al.

[11] Patent Number: 5,301,494
[45] Date of Patent: Apr. 12, 1994

[54] RECHARGING SYSTEM FOR A BATTERY OPERATED TOOL HAVING AN ON-BOARD TRANSFORMER

[75] Inventors: David G. Peot, Easley; G. Michael Hornick, Anderson; Adrian E. Hartz, Greenville; Charles K. Long, Seneca, all of S.C.

[73] Assignee: Ryobi Motor Products Corp., Easley, S.C.

[21] Appl. No.: 920,133

[22] Filed: Jul. 24, 1992

[51] Int. Cl.$^5$ .............................................. A01D 34/82
[52] U.S. Cl. ...................................... 56/10.5; 56/10.8; 320/2
[58] Field of Search ...................... 56/10.5, 10.8, 16.7, 56/17.5, 320.1, DIG. 24; 320/2

[56] References Cited

U.S. PATENT DOCUMENTS

| | | |
|---|---|---|
| 2,597,735 | 5/1952 | Jepson . |
| 3,581,480 | 6/1971 | O'Connor et al. . |
| 3,696,593 | 10/1972 | Thorod et al. . |
| 4,454,392 | 6/1984 | Rapp et al. ........................ 200/16.7 |
| 4,636,603 | 1/1987 | Pliml ................................ 200/296 |
| 4,794,315 | 12/1988 | Pederson et al. ...................... 320/2 |
| 5,085,043 | 2/1992 | Hess et al. ........................... 56/10.5 |

FOREIGN PATENT DOCUMENTS 3440510 7/1986 Fed. Rep. of Germany ....... 56/10.5

Primary Examiner—Irene Cuda
Assistant Examiner—John M. Husar
Attorney, Agent, or Firm—Brooks & Kushman

[57] ABSTRACT

A recharging system for a battery operated tool such as a lawn mower. A slidable cover is used which is movable between an open position and a closed position. The slidable cover alternately exposes a receptacle adapted to receive a removable fuse key and an electrical connector adapted to receive an electrical power cord. The receptacle and the electrical connector are longitudinally aligned with the cover so that for the cover to move to the open position and expose the electrical connector, the fuse key must be removed. The receptacle is electrically connected in series with an activation switch, the battery and the electric motor to form a motor circuit. When the fuse key is removed to expose the electrical connector, the motor circuit is broken which prevents the electric motor from being activated whether or not the activation switch is engaged. When the cover is moved to the closed position exposing the receptacle, the fuse key may be inserted into the receptacle, completing the motor circuit enabling the activation switch to activate the electric motor.

17 Claims, 2 Drawing Sheets

RECHARGING SYSTEM FOR A BATTERY OPERATED TOOL HAVING AN ON-BOARD TRANSFORMER

TECHNICAL FIELD

This invention relates to a recharging system for use with a battery powered tool, and more particularly to an access prevention system for a battery powered tool.

BACKGROUND ART

Recently, on-board chargers for battery operated tools have become desirable. When rechargeable batteries of battery operated tools are being recharged, it is essential that the motor be disengaged or inoperable. The system to be utilized with such on-board charges should prevent the motor from being engaged while the battery is being recharged regardless of the position of the activation switch. For the system to operate effectively, it must be user friendly. If the system for engaging and disengaging the motor circuit is difficult to operate, then operators are likely to attempt to devise a method to by-pass the system, defeating the benefits thereof.

In battery operated tools not having on-board rechargers, preventing activation of the motor when the tool is being recharged has been accomplished by various methods. An example of one approach is in U.S. Pat. No. 3,696,593 to Froud et al., which discloses a receptacle and two plugs which have obstructing members such that the plug corresponding to normal operation of the motor must be removed and a recharging plug must be inserted thereby preventing activation of the motor.

A related approach is disclosed in U.S. Pat. No. 3,581,480 to O'Connor et al., which contains two plugs, one for normal operation of the motor and one for recharging the battery such that to recharge the battery it is first necessary to unplug the first plug thereby preventing activation of the motor.

A more recent approach appears in U.S. Pat. No. 5,085,043 to Hess et al., which discloses an electromechanical interlock and module system for lawn mowers or other electrical devices. A mechanical key is adapted to be inserted into a specially configured opening in a top of a motor shroud. The key activates a plunger of a normally open interlock switch, thereby closing the switch and enabling the lawn mower power circuit. An integral tab simultaneously blocks the charging ports so the operator cannot connect a male plug from an outlet—mounted charging transformer while the power circuit is enabled. When the key is removed, the interlock switch returns to an "off" position and the power circuit of the lawn mower is disabled. When the key member is removed, the charging port is exposed permitting connection of the charger circuit to the charging transformer.

The present invention is directed to improving known recharging systems for a battery operated tool having an on-board transformer.

SUMMARY OF THE INVENTION

An object of the present invention is to provide a recharging system which requires the electrical circuit to the activation switch and motor be broken before the battery can be recharged.

A further object of the present invention is to provide a recharging system for use with battery operated tools.

A specific object of the present invention is to provide a battery operated tool which has an electric motor, a battery, and an activation switch which is shiftable between an on position and an off position for selectively activating the electric motor. A receptacle is provided which is electrically connected in series with the activation switch, the battery and the motor to form a motor circuit. An electrical connector is located within a housing for receiving an electrical power cord. The connector cooperates electrically with the transformer. A removable key is adapted to be inserted into the receptacle. A cover is provided which cooperates with the housing and the key. The cover is movable between an open position allowing access to the connector and a closed position which prevents access to the connector. The cover is oriented relative to the receptacle such that said key must first be removed from the receptacle before the cover may be moved to the open position. The removal of the key breaks the motor circuit thereby preventing motor from being activated and operating while the battery is recharging.

Another specific object of the present invention is to provide a battery operated mower which has an electric motor, a battery, and an activation switch which is shiftable between an on position and an off position for selectively activating the electric motor. A receptacle is provided which is electrically connected in series with the activation switch, the battery and the motor to form a motor circuit. An electrical connector is located within a housing for receiving an electrical power cord. The connector cooperates electrically with the transformer. A removable key is adapted to be inserted into the receptacle. A cover is provided which cooperates with the housing and the key. The cover is movable between an open position allowing access to the connector and a closed position which prevents access to the connector. The cover is oriented relative to the receptacle such that said key must first be removed from the receptacle before the cover may be moved to the open position. The removal of the key breaks the motor circuit thereby preventing motor from being activated and operating while the battery is recharging.

A further specific object of the present invention is to provide a fuse key which cooperates with a lawn mower having an electric motor, a battery, and an activation switch shiftable between an on position and an off position for selectively activating the motor. A receptacle is provided which is located on the lawn mower. The receptacle is electrically connected in series with the activation switch, the battery and the motor to form a motor circuit. A key is provided for removably retaining a fuse therein. The key is removably adapted to be inserted into the receptacle wherein insertion of the key into the receptacle closes the motor circuit enabling operation of the lawn mower upon movement of the activation switch to the on position. Removal of the key from the receptacle opens the motor circuit which prevents operation of the lawn mower regardless of the position of the activation switch.

The above objects, features, and advantages of the present invention are readily apparent from the following detailed description of the invention when taken in connection with the accompanying drawings.

BRIEF DESCRIPTION OF THE INVENTION

DETAILED DESCRIPTION OF THE INVENTION

The embodiment shown in FIGS. 1 through 7, illustrates a battery operated lawn mower 10, having a battery 14 and an electric motor 16.

Figure 1:
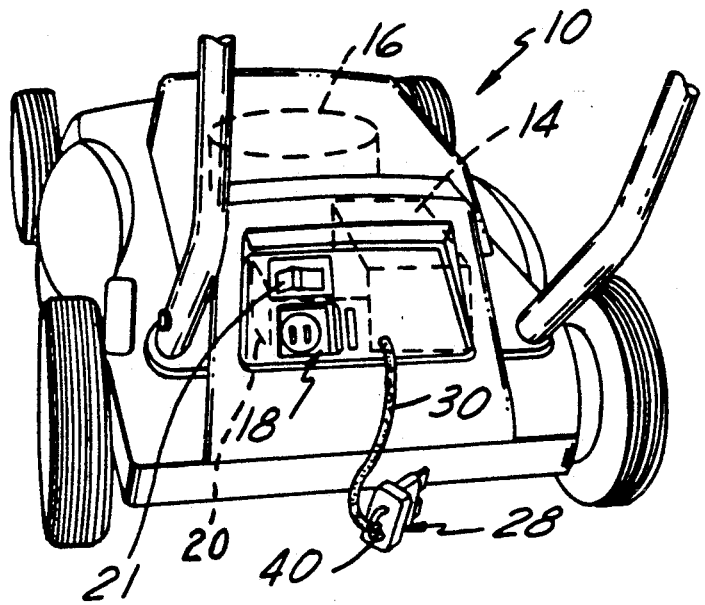
FIG. 1 is a perspective view of a lawn mower showing the major elements of the invention.
Figure 2:
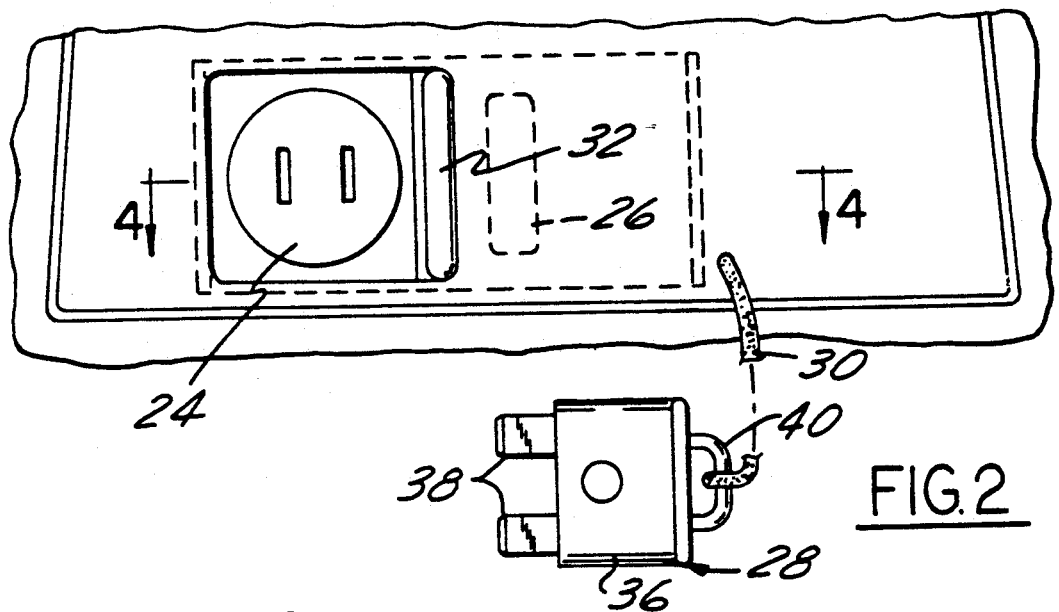
FIG. 2 is an enlarged end view of a portion of the invention showing the cover in the open position and the key removed, in accordance with the present invention.
Figure 3:
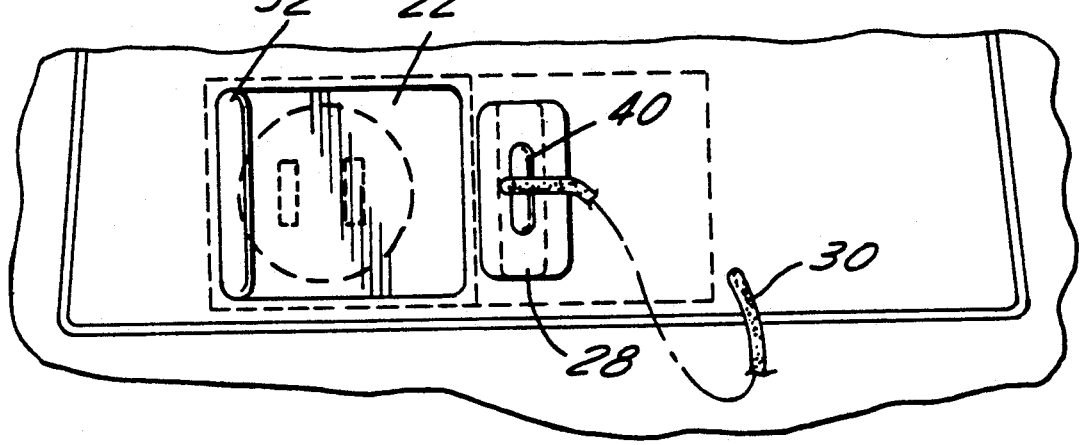
FIG. 3 is a view similar to that shown in FIG. 2 showing the cover in the closed position with the cover closed and the key inserted, in accordance with the present invention.

As shown in FIGS. 1 through 3, a housing 18 is located at the rear (toward the operator) of the lawn mower 10. The housing location is not critical to the invention so long as the housing 18 is easily accessible to the operator and functions in the fashion described below. The housing 18 is generally rectangular in shape and is affixed to the lawn mower 10 in a pocket 20 adapted to receive the housing 18.

Located within the housing 18 is a power meter 21 which provides the operator with an indication of the level of charge remaining in the battery 14. Also located within the housing 18 is a cover 22 which is slidable between an open position and a closed position. A connector 24 and a receptacle 26 are located within the housing in longitudinal alignment. Also located within the housing 18 is a removable fuse key 28 which is adapted to be removably seated within the receptacle 26. The key 28 is tethered to the lawn mower by a tether 30 so that when the key 28 is removed from the receptacle 26 the key 28 remains attached and easily accessible to the operator.

The cover 22 has a handle 32 which assists the operator in moving the cover 22. Movement of the cover 22 between the open position and the closed position alternatively exposes either the connector 24 or the receptacle 26 while preventing access to the other of either the connector 24 or the receptacle 26. The cover 22 slides between the open position and the closed position by sliding along a predetermined path within the housing 18.

Figure 4:
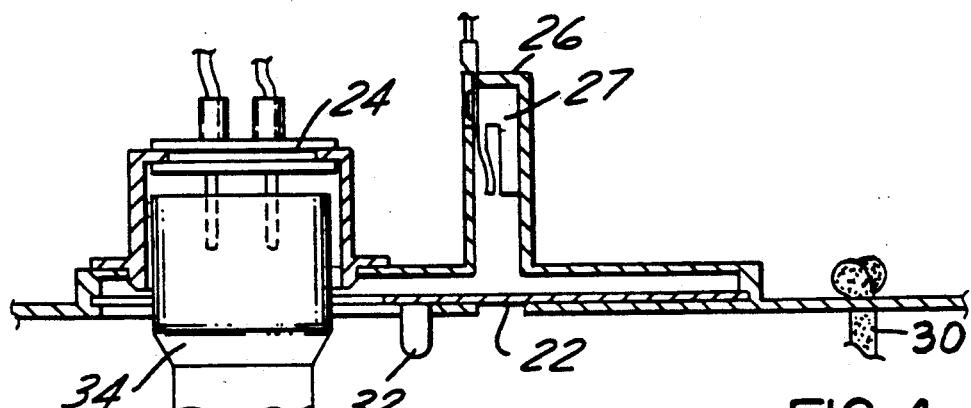
FIG. 4 is a cross-sectional view of the invention taken along line 4—4 of FIG. 2, showing the electrical power cord connected to the electrical connector.

The connector 24, as shown in FIGS. 1 through 6, is a conventional male 110 V two bladed plug 24 which is intended to receive a female socket end of a conventional electrical power cord 34 shown in FIG. 4. Electrical connector 24 is operably connected to battery 14 via transformer 23 and rectifier circuit 25. The transformer reduces the 110 V input from connector 24 to battery voltage. In the preferred embodiment illustrated a 24 volt battery is used, therefore, there is an appropriate number of turns in the primary and secondary windings of the transformer to achieve the desired reduction in voltage. The transformer's secondary output is converted from an alternating current to a direct current by a conventional rectifier 25. Connector 24, transformer 23 and rectifier 25 provide a charging circuit for battery 14. Alternatively, the transformer and rectifier circuit can be mounted outside of the lawn mower. In that instance, the electrical connector 24 would be replaced with a 24 volt DC type connector which would be electrically connected to opposite poles of the battery 14.

Figure 5:
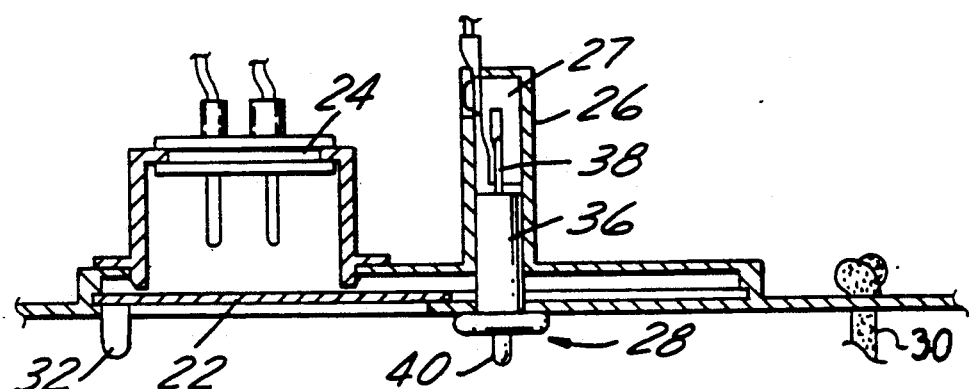
FIG. 5 is a view of the invention similar to the view shown in FIG. 4 showing the cover in the closed position and the key inserted.
Figure 7:
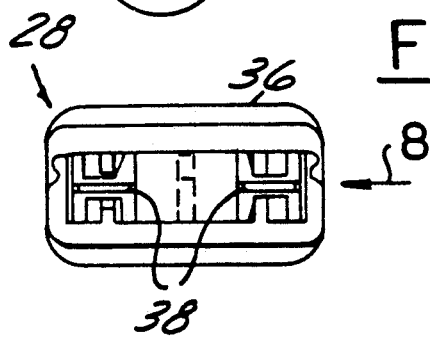
FIG. 7 is a end view of the removable key in accordance with the present invention.
Figure 8:
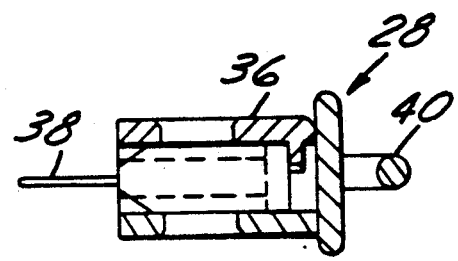
FIG. 8 is a side view in cross section of the removable key, in accordance with the present invention.

As shown in FIGS. 2, 4 and 5, the receptacle 26 has a clip 27 which is adapted to receive the key 28. The key 28 as best shown in FIGS. 2, 7 and 8, has a retainer 36, a conventional fuse 38 which is removably held within the retainer 36 and a handle 40 to assist the operator to insert and remove the key 28. The key 28 may only be inserted into the receptacle 26 when the cover 22 is in the closed position. The fuse 38 which is utilized with the key 28 is a fusible link with the motor circuit 99, such that when overloaded, the fuse 38 will blow or burn. When this occurs, the fuse 38 may be easily replaced by removing the damaged fuse 38 from the retainer 36 and replacing it with a new or operable fuse 38. Alternatively, the fuse 38 may be a resettable fuse similar to a conventional circuit breaker. Thus, when the motor circuit 99 is overloaded, the fuse 38 will be tripped breaking (i.e., opening) the motor circuit 99 to prevent the electric motor 16 from being engaged regardless of the position of an activation switch 42. The fuse 38 may be reset allowing for the motor circuit 99 to be closed enabling normal operation of the electric motor.

Figure 6:
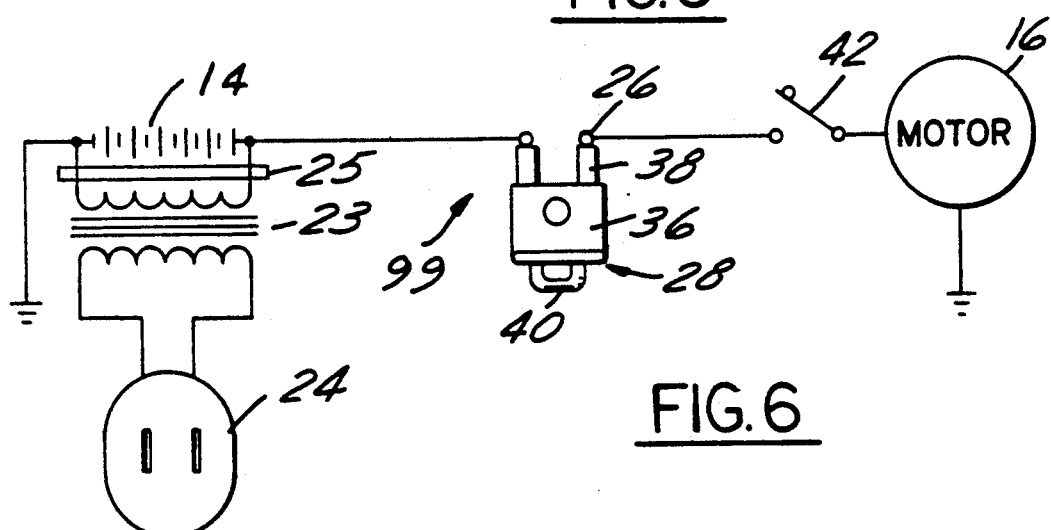
FIG. 6 is a schematic representation of the invention showing the motor circuit and the electrical relationship between the elements in accordance with the present invention.

As shown in FIG. 6, the electric motor 16, the receptacle 26, the connector 24 and the activation switch 42 (schematically represented) are electrically connected in series to form a motor circuit 99. The result of the configuration shown in FIG. 6 is that when the cover 22 is closed (as in FIG. 5), seating the key 28 within the receptacle 26 completes the motor circuit 99, which allows the electric motor 16 to be activated by the activation switch 42. When the key 28 is removed from the receptacle 26, the motor circuit 99 is broken. The cover 22 may then be moved to the open position.

The receptacle 26, the connector 24 and the cover 22 are oriented in longitudinal relationship such that the cover 22 may only be moved to the open position after the key 28 has been removed from the receptacle 26. Access to the receptacle 26 is blocked by the cover 22 when the cover 22 is in the open position. When the cover 22 is in the closed position, access to the connector 26 is denied. This relationship is best shown in FIGS. 2 through 5.

When the cover 22 is in the open position, the key 28 has been removed and access to the receptacle 26 is possible. In the open position, the power cord 34 is placed into the connector 26 for recharging the battery 14. Because the key 28 is removed and the motor circuit 99 is broken, the electric motor 16 may not be activated even though the activation switch 42 is engaged. The electric motor 16 may only be activated when the cover 22 is in the closed position and the key 28 is seated within the receptacle 26. The purpose of such a configuration is to prevent the motor 16 from being activated regardless of the position of the activation switch 42 while the battery 14 is being recharged.

While the best mode for carrying out the invention has been described in detail, those familiar with the art to which this invention relates will recognize various alternative designs and embodiments for practicing the invention as defined by the following claims.

What is claimed is:

1. A battery operated tool having an electric motor, a battery and an activation switch, shiftable between an ON and an OFF position for selectively activating said motor, said tool comprising:
   a housing;
   a receptacle electrically connected in series with said activation switch, said battery and said motor to form a motor circuit;
   an electrical connector within said housing for receiving an electrical power cord, said connector cooperating electrically with said battery;
   a removable key adapted to be inserted into said receptacle; and
   a cover cooperating with said housing and said key, said cover movable between an open position allowing access to said connector and a closed position preventing access to said connector, said cover oriented relative said receptacle such that said key must first be removed from said receptacle before said cover may be moved to said open position, wherein removal of said key breaks said motor circuit thereby preventing motor operation while the battery is recharging.

2. The tool of claim 1 wherein said cover slidably cooperates with said housing, said cover slides between said open position and said closed position along a predetermined path within said housing.

3. The tool of claim 1, wherein said receptacle is located adjacent said connector such that movement of said cover toward said open position exposes said connector and prevents access to said receptacle, and movement of said cover toward said closed position exposes said receptacle and prevents access to said connector.

4. The tool of claim wherein said key comprises a fuse affixed to a handle removably seated within said receptacle, such that said key, when seated abuts said cover to prevent slidable movement of said cover toward said open position.

5. The tool of claim wherein said key further includes attachment means for attaching said key to said tool such that when removed from said receptacle, said key remains attached to said tool.

6. The tool of claim 1 wherein said connector is a conventional electrical connector.

7. The tool of claim 1 further comprising a transformer and a rectifier circuit wherein the transformer is provided with a primary winding connected to the electrical connector and a secondary winding providing a reduced voltage AC power supply to the rectifier circuit which converts the AC power to DC, said rectifier circuit operatively connected to the battery.

8. A battery operated lawn mower having an electric motor, a battery and an activation switch, shiftable between an ON and an OFF position for selectively activating said motor, said lawn mower comprising:
   a housing;
   a receptacle electrically connected in series with said activation switch, said battery and said motor to form a motor circuit;
   an electrical connector within said housing for receiving an electrical power cord, said connector cooperating electrically with said battery;
   a removable key adapted to be inserted into said receptacle; and
   a cover cooperating with said housing and said key, said cover movable between an open position allowing access to said connector and a closed position preventing access to said connector, said cover oriented relative said receptacle such that said key must first be removed from said receptacle before said cover may be moved to said open position, wherein removal of said key breaks said motor circuit thereby preventing motor operation while said battery is recharging.

9. The lawn mower of claim 8 wherein said cover slidably cooperates with said housing, said cover slides between said open position and said closed position along a predetermined path within said housing.

10. The lawn mower of claim 8 wherein said receptacle is located adjacent said connector such that movement of said cover toward said open position exposes said connector and prevents access to said receptacle, and movement of said cover toward said closed position exposes said receptacle and prevents access to said connector.

11. The lawn mower of claim 8 wherein said key comprises a fuse affixed to a handle removably seated within said receptacle, such that said key, when seated abuts said cover to prevent slidable movement of said cover toward said open position.

12. The lawn mower of claim 8 wherein said key further includes attachment means for attaching said key to said tool such that when removed from said receptacle, said key remains attached to said tool.

13. The lawn mower of claim 8 wherein said connector is a conventional electrical connector.

14. The tool of claim 8 further comprising a transformer and a rectifier circuit wherein said transformer is provided with a primary winding connected to said electrical connector and a secondary winding providing a reduced voltage AC power supply to said rectifier circuit which converts the AC power to DC, said rectifier circuit operatively connected to said battery.

15. A battery operated tool having an electric motor, a battery, a fuse, and an activation switch, shiftable between an ON and OFF position for selectively activating said motor, said tool comprising:
   a housing;
   a receptacle electrically connected in series with said activation switch, said fuse, said battery and said motor to form a motor circuit;
   an electrical connector within said housing for receiving an electrical power cord, said connector cooperating electrically with said battery;
   a key for removably retaining said sue therein, said key removably adapted to be inserted into said receptacle wherein insertion of said key into said receptacle to cause said fuse to complete said motor circuit enabling operation of said tool upon movement of said activation switch to said ON position, and removal of said key and the use retainer therein from said receptacle opens said motor circuit preventing operation of said tool regardless of the position of said activation switch.

16. The tool of claim 15 further comprising means to prevent connection of an electrical power cord to said electrical connector when said fuse key is inserted in said receptacle.

17. The tool of claim 16 wherein said means to prevent connection of an electrical power cord comprises a cover cooperating with a housing and said key, said cover movable between an open position allowing access to said connector and a closed position preventing access to said connector, said cover oriented relative to said receptacle such that said key must first be removed from said receptacle before said cover may be moved to said open position.

* * * * *

UNITED STATES PATENT AND TRADEMARK OFFICE
CERTIFICATE OF CORRECTION

PATENT NO. : 5,301,494
DATED : April 12, 1994
INVENTOR(S) : David G. Peot et al.

It is certified that error appears in the above-identified patent and that said Letters Patent is hereby corrected as shown below:

Column 5, Line 43, Claim 4, after "claim" insert --1--.

Column 5, Line 48, Claim 5, after "claim" insert --1--.

Column 6, Line 57, Claim 15, delete "sue" and insert --fuse--.

Column 6, Lines 63-64, Claim 15, delete "use" retainer" insert --fuse retainer--.

Signed and Sealed this

Thirtieth Day of August, 1994

Attest:

BRUCE LEHMAN

Attesting Officer        Commissioner of Patents and Trademarks